(12) United States Patent
Li et al.

(10) Patent No.: US 10,199,923 B2
(45) Date of Patent: Feb. 5, 2019

(54) DISCHARGING CIRCUIT, POWER SUPPLY AND DISPLAY DEVICE

(71) Applicant: BOE TECHNOLOGY GROUP CO., LTD., Beijing (CN)

(72) Inventors: Yanfu Li, Beijing (CN); Masakazu Okamura, Beijing (CN); Zhigang Zhou, Beijing (CN); Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 86 days.

(21) Appl. No.: 15/325,378

(22) PCT Filed: Feb. 2, 2016

(86) PCT No.: PCT/CN2016/073197
§ 371 (c)(1),
(2) Date: Jan. 10, 2017

(87) PCT Pub. No.: WO2017/049832
PCT Pub. Date: Mar. 30, 2017

(65) Prior Publication Data
US 2018/0219470 A1  Aug. 2, 2018

(30) Foreign Application Priority Data

Sep. 21, 2015 (CN) .................... 2015 2 0734847 U

(51) Int. Cl.
- *H02M 1/32* (2007.01)
- *H02M 1/42* (2007.01)
- *G06F 1/26* (2006.01)

(52) U.S. Cl.
CPC ............... *H02M 1/32* (2013.01); *G06F 1/26* (2013.01); *H02M 1/42* (2013.01);
(Continued)

(58) Field of Classification Search
CPC .... Y02B 70/126; H02M 1/42; H02M 1/4258; H02M 2001/322; H02M 2001/0032; H02J 7/0026; H02J 2007/004; H02J 2007/0067
(Continued)

(56) References Cited

U.S. PATENT DOCUMENTS 5,684,679 A * 11/1997 Hong ...................... H02M 1/36
307/33
2011/0164339 A1 * 7/2011 Schmid ............... H02M 1/4208
361/18

(Continued)

FOREIGN PATENT DOCUMENTS

| CN | 1132420 A | 10/1996 |
|---|---|---|
| CN | 103236787 A | 8/2013 |
| CN | 240993046 U | 1/2016 |

OTHER PUBLICATIONS

International Search Report and Written Opinion from PCT Application Serial No. PCT/CN2016/073197, dated Jun. 27, 2016, 12 pages.

*Primary Examiner* — Alex Torres-Rivera
(74) *Attorney, Agent, or Firm* — Kinney & Lange, P.A.

(57) ABSTRACT

The present disclosure provides a discharging circuit, a power supply, and a display device for a rapid discharging, without causing any inconveniences to a user. The discharging circuit comprises a controlling section and a discharging section, wherein a controlling section is connected to a control voltage inputting terminal and a control node, and configured to adjust a voltage at the control node, under the control of a control voltage inputted from the control voltage inputting terminal; and a discharging section is connected to the control node, a first level terminal and a discharge voltage inputting terminal, and configured to conduct a connection between the discharge voltage inputting terminal and the first level terminal, under the control of the voltage (Continued)

at the control node, so as to discharge the discharge voltage inputting terminal through the first level terminal. Embodiments of the present disclosure may be used in the manufacture of display devices.

7 Claims, 3 Drawing Sheets

(52) U.S. Cl.
CPC ....... *G09G 2330/04* (2013.01); *H02M 1/4208* (2013.01); *H02M 2001/322* (2013.01)

(58) Field of Classification Search
USPC ...... 323/207; 363/34, 37, 50, 51, 52, 53, 54, 363/55, 56, 57, 58
See application file for complete search history.

(56) References Cited

U.S. PATENT DOCUMENTS

| | | | | |
|---|---|---|---|---|
| 2011/0188270 | A1* | 8/2011 | Schmid | H02M 1/4208 363/21.12 |
| 2013/0027983 | A1* | 1/2013 | Nate | H02M 3/335 363/21.01 |
| 2013/0335038 | A1* | 12/2013 | Lee | H02M 1/126 320/166 |
| 2014/0233264 | A1* | 8/2014 | Lin | H02M 1/4258 363/17 |

* cited by examiner

US 10,199,923 B2

DISCHARGING CIRCUIT, POWER SUPPLY AND DISPLAY DEVICE

CROSS-REFERENCE TO RELATED APPLICATION(S)

This application is a section 371 national stage application of international application no. PCT/CN2016/073197, and claims priority to the Chinese application no. 201520734847.2 filed on 21 Sep. 2015, which is incorporated herein by reference in their entirety.

TECHNICAL FIELD

The present disclosure generally relates to a field of display technology, and more particularly, to a discharging circuit, a power supply, and a display device.

BACKGROUND

Conventionally, display devices have been widely applied to various electronic devices, such as a mobile phone, a personal digital assistant (PDA), a digital camera, a computer screen, or a notebook computer screen. Making the display devices thin and light is becoming one of important trends in the field of electrical devices.

In order to realize slimness of the display devices, an integrating level for an integrated circuit board inside the display device is increased continuously, and the size for the integrated circuit board inside the display device is reduced continuously. An integrated power circuit board inside the display device is typically used to provide an operating voltage and a standby voltage, wherein the operating voltage and the standby voltage are respectively realized by a transformer. Conventionally, in order to reduce the size of the integrated power circuit board, the operating voltage and the standby voltage are realized by the same transformer, thereby reducing the number of transformers in the integrated power circuit board and reducing the size of the integrated power circuit board. However, in a conventional scheme in which the operating voltage and the standby voltage are realized by the same transformer, since a load at an outputting terminal for the standby voltage in the integrated power circuit board is small when a power supply is turned off in a standby state, the outputting terminal for the standby voltage cannot perform a rapid discharging, so that an indicator light may be turned on for a long time, which may cause a user being disturbed.

SUMMARY

Embodiments of the present disclosure provide a discharging circuit, a power supply, and a display device for a rapid discharging, without causing inconveniences to a user.

According to an aspect of the present disclosure, an embodiment of the present disclosure provides a discharging circuit, which may comprise:
 a controlling section, connected to a control voltage inputting terminal and a control node, and configured to adjust a voltage at the control node, under the control of a control voltage inputted from the control voltage inputting terminal; and
 a discharging section, connected to the control node, a first level terminal and a discharge voltage inputting terminal, and configured to conduct a connection between the discharge voltage inputting terminal and the first level terminal, under the control of the voltage at the control node, so as to discharge a voltage at the discharge voltage inputting terminal through the first level terminal.

The controlling section may comprise at least one resistor and at least one diode;
 wherein the at least one resistor is connected with the at least one diode in series, and the control voltage inputted from the control voltage inputting terminal is applied to an anode of the at least one diode.

Optionally, the at least one resistor may comprise a first resistor and a second resistor, and the at least one diode may comprise a first diode and a second diode;
 wherein a first terminal of the first resistor is connected to the control voltage inputting terminal, and a second terminal of the first resistor is connected to a first terminal of the second resistor;
 wherein a second terminal of the second resistor is connected to an anode of the first diode;
 wherein a cathode of the first diode is connected to an anode of the second diode; and
 wherein a cathode of the second diode is connected to the control node.

Optionally, the discharging section may comprise a third resistor, a fourth resistor and a transistor;
 wherein a first terminal of the third resistor is connected to the control node, and a second terminal of the third resistor is connected to a gate of the transistor;
 wherein a first terminal of the fourth resistor is connected to the gate of the transistor, and a second terminal of the fourth resistor is connected to the first level terminal; and
 wherein a first terminal of the transistor is connected to the discharge voltage inputting terminal, and a second terminal of the transistor is connected with the first level terminal.

Optionally, the discharging section may further comprise a capacitor;
 wherein a first electrode of the capacitor is connected to the control node, and a second electrode of the capacitor is connected to the first level terminal.

According to another aspect of the present disclosure, a power supply is provided, which may comprise: a rectification section, a power factor corrector, a transformer, a first capacitor bank, a second capacitor bank and the discharging circuit according to the first aspect of the present disclosure;
 wherein a first stage of the transformer is connected to a voltage inputting terminal via the rectification section and the power factor corrector; the first capacitor bank comprises at least one capacitor connected in parallel, a first terminal of the first capacitor bank being connected to the first stage of the transformer and a second terminal of the first capacitor bank being connected to a ground; the second capacitor bank comprises at least one capacitor connected in parallel, a first terminal of the second capacitor bank being connected to a secondary stage of the transformer and a second terminal of the second capacitor bank being connected to the ground; and the secondary stage of the transformer is connected to an outputting terminal for an operating voltage and an outputting terminal for a standby voltage; and
 wherein the control voltage inputting terminal of the discharging circuit is connected to the voltage inputting terminal, and the discharge voltage inputting terminal of the discharging circuit is connected to the first terminal of the first capacitor bank, and the first level terminal of the discharging circuit is connected to the ground.

Optionally, the transistor of the discharging circuit may be a metal-oxide semiconductor (MOS) transistor.

Optionally, the transistor of the discharging circuit may have a breakdown voltage greater than 400 V and less than 500 V.

Optionally, the third resistor of the discharging circuit may have a resistance greater than 80 ohms and less than 120 ohms, and the fourth resistor of the discharging circuit may have a resistance greater than 8K ohms and less than 15K ohms.

According to yet another aspect of the present disclosure, a display device is provided, which may comprise the power supply according to the present disclosure.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION

In the following, specific implementations of the present disclosure are discussed in detail in combination of the figures and various embodiments. The following embodiments are intended to illustrate the present disclosure, rather than limit the scope of the disclosure. All other embodiments obtained by those of ordinary skill in the art based on the embodiments of the present disclosure without creative effort are intended to be included in the scope of the present disclosure.

The transistor used in the embodiments of the present invention may be a thin film transistor or a field effect transistor or other device having the same characteristics. The transistor used in the embodiment of the present invention is mainly a switch transistor, depending on its action in the circuit. Since a source and a drain of the switch transistor used herein are symmetrical, the source and the drain of the switch transistor are interchangeable. In this embodiment, in order to distinguish two electrodes of the transistor other than a gate, one of them is referred to as a source and the other is referred to as a drain. Throughout the drawings, the middle terminal of the transistor is defined as a gate, the signal inputting terminal is defined as the source, and the signal outputting terminal is defined as the drain. Further, the switch transistor used in the embodiments of the present disclosure is a PNP type switch transistor, which is referred to as a P-type switch transistor for simplicity. The P-type switch transistor is turned on while its gate is at a low level, and turned off while its gate is at a high level. Opposite to the P-type transistor, a NPN type switch transistor is referred to as a N-type switch transistor, which is turned on when its gate is at a high level and turned off when its gate is at a low level.

Figure 1:
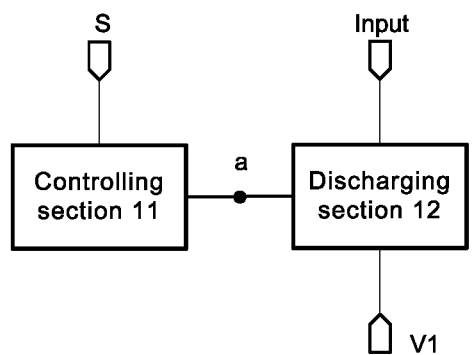
FIG. 1 shows a schematic structural diagram of a discharging circuit according to an embodiment of the present disclosure.

The embodiment of the present disclosure provides a discharging circuit, which may comprise: a controlling section 11 and a discharging section 12, as shown in FIG. 1.

The controlling section 11 is connected to a control voltage inputting terminal S and a control node a, and configured to adjust a voltage at the control node a, under the control of a control voltage inputted from the control voltage inputting terminal S.

The discharging section 12 is connected to the control node a, a first level terminal V1 and a discharge voltage inputting terminal Input, and configured to conduct a connection between the discharge voltage inputting terminal Input and the first level terminal V1, under the control of the voltage at the control node a, so as to discharge the discharge voltage inputting terminal Input through the first level terminal V1.

Further, the controlling section 11 may comprise at least one resistor and at least one diode.

The resistance and the diode are connected in series, and the control voltage inputted from the control voltage inputting terminal is applied to the anode of the diode.

The resistors and the diodes are included in the controlling section, wherein the number of the resistors can be set to an arbitrary value according to a requirement on the resistance of the discharging circuit, and the number of the diodes can also be set to an arbitrary value according to a requirement on a voltage difference between the control voltage inputting terminal S and the control node a of the discharging circuit. The numbers of resistors and diodes are not limited in this application. For example, the number of resistors may be: 1, 2, 3 or others. Likewise, the number of diodes may be: 1, 2, 3 or others.

Further, the resistor and the diode are connected in series in the above-described embodiment, and the present invention does not limit the sequence of the resistor and the diode, that is, the connection of the resistor and the diode can be performed in any order. For example, in a case that the controlling section comprises one resistor and one diode, the control voltage inputting terminal S can either be connected to the resistor which is connected to the diode connecting with the control node a, or be connected to the diode which is connected to the resistor connecting with the control node a.

Further, the control voltage inputted from the control voltage inputting terminal is applied to the anode of the diode. That is, for any diode, if the resistor and other diodes are ignored, its anode is connected to the control voltage inputting terminal S and its cathode is connected to the control node a.

Figure 2:
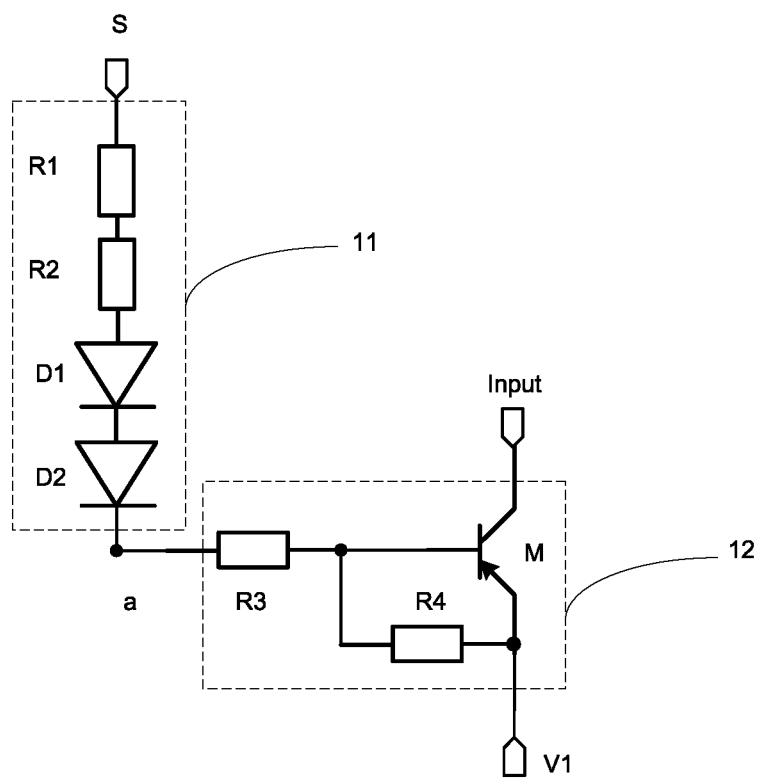
FIG. 2 shows a circuit diagram of the discharging circuit according to the embodiment of the present disclosure.

FIG. 2 shows a specific implementation of the circuit. As shown in FIG. 2, the controlling section 11 may comprise a first resistor R1, a second resistor R2, a first diode D1, and a second diode D2. A first terminal of the first resistor R1 is connected to the control voltage inputting terminal S, a second terminal of the first resistor R1 is connected to a first terminal of the second resistor R2; a second terminal of the second resistor R2 is connected to an anode of the first diode D1; a cathode of the first diode D1 is connected to an anode of the second diode D2; and a cathode of the second diode D2 is connected to the control node a.

The discharging section 12 may comprise a third resistor R3, a fourth resistor R4 and a transistor M. A first terminal of the third resistor R3 is connected to the control node a, and a second terminal of the third resistor R3 is connected to a gate of the transistor M; a first terminal of the fourth resistor R4 is connected to the gate of the transistor M, and a second terminal of the fourth resistor R4 is connected to the first level terminal V1; and a first terminal of the transistor M is connected to the discharge voltage inputting terminal Input, and a second terminal of the transistor M is connected to the first level terminal V1.

Figure 3:
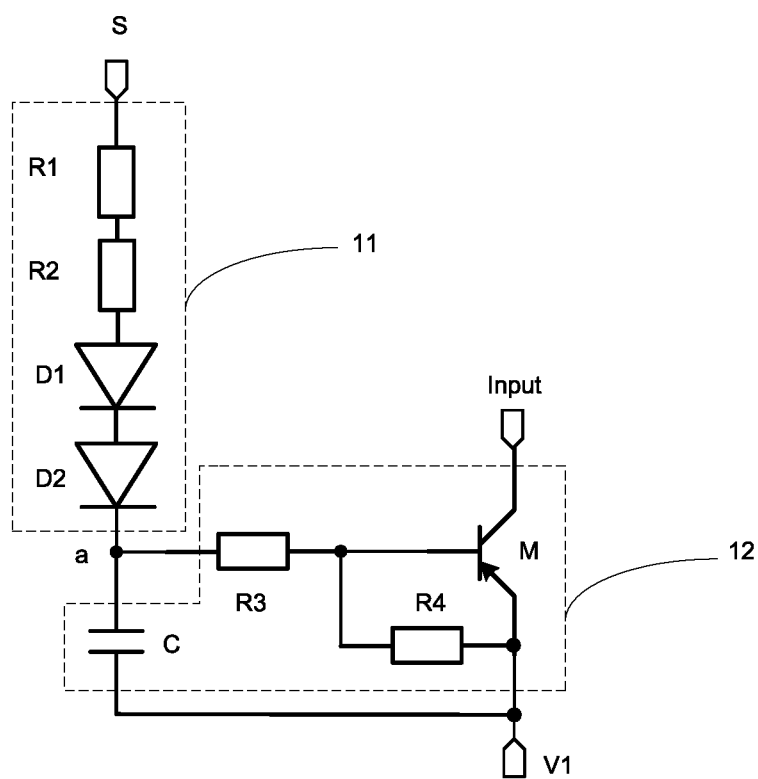
FIG. 3 shows a circuit diagram of a discharging circuit according to another embodiment of the present disclosure.

FIG. 3 shows another specific implementation. As shown in FIG. 3, the controlling section 11 may comprise a first resistor R1, a second resistor R2, a first diode D1, and a second diode D2. A first terminal of the first resistor R1 is connected to the control voltage inputting terminal S, a second terminal of the first resistor R1 is connected to a first terminal of the second resistor R2; a second terminal of the second resistor R2 is connected to an anode of the first diode D1; a cathode of the first diode D1 is connected to an anode of the second diode D2; and a cathode of the second diode D2 is connected to the control node a.

The discharging section 12 may comprise a third resistor R3, a fourth resistor R4, a transistor M and a capacitor C. A first terminal of the third resistor R3 is connected to the control node a, and a second terminal of the third resistor R3 is connected to a gate of the transistor M; a first terminal of the fourth resistor R4 is connected to the gate of the transistor M, and a second terminal of the fourth resistor R4 is connected to the first level terminal V1; a first terminal of the transistor M is connected to the discharge voltage inputting terminal Input, and a second terminal of the transistor M is connected to the first level terminal V1; and a first electrode of the capacitor C is connected to the control node a, and a second electrode of the capacitor C is connected to the first level terminal V1.

In actual use, the control voltage inputting terminal of the discharging circuit may output an abnormal transient voltage due to its instability or an interference of other circuits. In this case, when the discharge voltage inputting terminal does not need to be discharged, the transistor may be turned on in error, which may conduct the connection between the discharge voltage inputting terminal and the first level terminal, affecting a normal operation of the circuit. According to the above-described embodiment, the added capacitor can absorb the abnormal transient voltage, and then discharge the abnormal transient voltage through the third resistor and the fourth resistor. Therefore, an erroneous conduction of the transistor resulted from the abnormal transient voltage outputted from the control voltage inputting terminal can be avoided, thereby enabling a normal operation of the circuit.

The principle of the discharging circuit shown in FIG. 2 will be described by taking the following case for an example, where the control voltage inputting terminal S supplies a high level, the first level terminal V1 supplies a low level, and a transistor M is a P type transistor.

When the control voltage inputting terminal S is supplying a high level, the control node a is at a high level, the transistor M is turned off, and the discharging circuit does not discharge the voltage at the discharge voltage inputting terminal Input.

When the control voltage inputting terminal S stops supplying the high level, the control node a is at a low level, the transistor M is turned on, the discharge voltage inputting terminal Input is connected to the first level terminal V1 via the transistor M, and the voltage at the discharge voltage inputting terminal Input is discharged via the first level terminal V1.

In addition, since the discharging circuit shown in FIG. 3 has the same principle as the discharging circuit shown in FIG. 2, the description of which will not be repeated.

Figure 4:
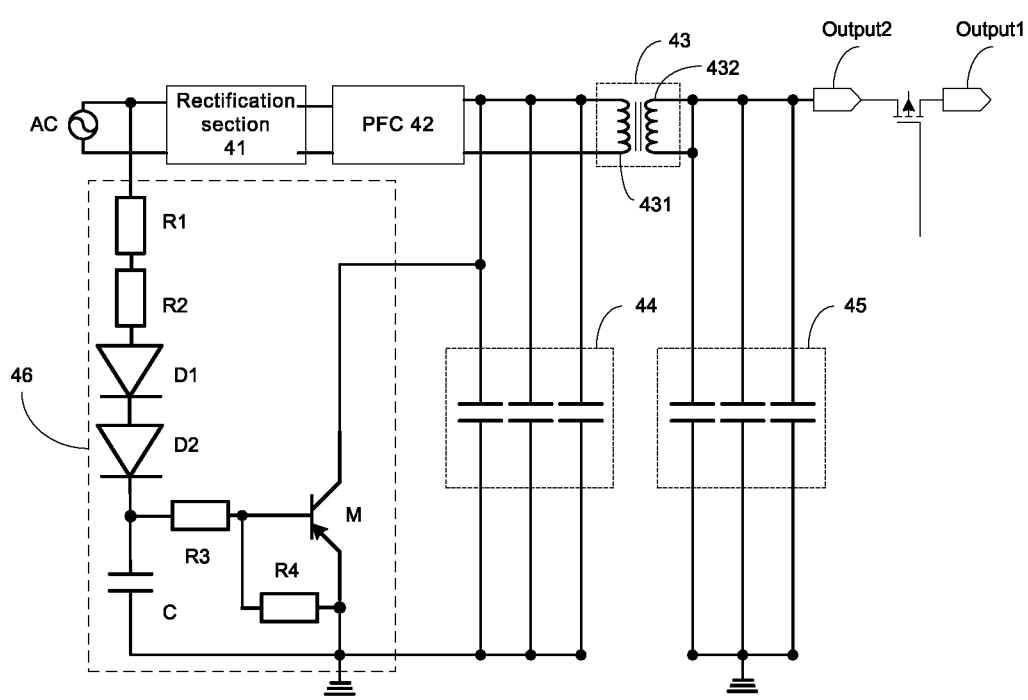
FIG. 4 shows a schematic structural diagram of a power supply according to an embodiment of the present disclosure.

Another embodiment of the present disclosure provides a power supply. As shown in FIG. 4, the power supply may comprise a rectification section 41, a power factor Corrector (PFC) 42, a transformer 43, a first capacitor bank 44, a second capacitor bank 45, and the discharging circuit 46 according to any one of the above embodiments.

A primary stage 431 of the transformer 43 is connected to a voltage inputting terminal AC via a rectification section 41 and a power factor corrector 42. The first capacitor bank 44 comprises at least one capacitor connected in parallel, a first terminal of the first capacitor bank 44 being connected to the primary stage of the transformer 431 and a second terminal of the first capacitor bank being connected to a ground; the second capacitor bank comprises at least one capacitor connected in parallel, a first terminal of the second capacitor bank being connected to a secondary stage of the transformer and a second terminal of the second capacitor bank being connected to the ground; and the secondary stage 432 of the transformer 43 is connected to an outputting terminal for an operating voltage Output 1 and an outputting terminal for a standby voltage Output 2.

The control voltage inputting terminal S of the discharging circuit 46 is connected to the voltage inputting terminal AC, the discharge voltage inputting terminal Input of the discharging circuit 46 is connected to the first terminal of the first capacitor bank 43, the first level terminal of the discharging circuit 46 is grounded and the transistor is a PNP type transistor.

In the power supply of the above embodiment, the control node a of the discharging circuit 46 is at a high level when the voltage inputting terminal AC inputs a high level. In this case, since the transistor M in the discharging circuit 46 is a PNP type transistor, the transistor M is turned off, and the power supply can output the operation voltage through the outputting terminal for the operating voltage Output 1 and output the standby voltage through the outputting terminal for the standby voltage Output 2. When the voltage inputting terminal AC stops inputting, the control node a of the discharging circuit 46 is at a low level. In this case, since the transistor M in the discharging circuit 46 is a PNP type transistor, the transistor M is turned on, and the first capacitor bank 44 is grounded through the transistor M. The charge stored in the first capacitor bank 44 can be rapidly discharged through the first level terminal V1. The first capacitor bank 44 will stop supplying power to the second capacitor bank 45 after being discharged. Thus, the discharging time of the secondary stage of the transformer can be reduced, which enables a rapid turning off of an indicator light, so as not to cause any inconveniences to a user.

Optionally, the transistor of the discharging circuit is an integrated MOS transistor.

Preferably, the transistor M of the discharging circuit 46 may have a breakdown voltage greater than 400 V and less than 500 V.

Usually, the AC voltage is 220V and a voltage after being rectified may arrive at about 380V. If the transistor has a small breakdown voltage, the high voltage is likely to break down the transistor or burn the transistor, which may affect a normal operation of the circuit. On the contrary, if the transistor has a high breakdown voltage, the manufacture of the transistor becomes difficult. Therefore, it is preferable to set the breakdown voltage of the transistor to be between 400 V and 500 V.

More preferably, the resistance of the third resistor of the discharging circuit is greater than 80 ohms and less than 120 ohms, and the resistance of the fourth resistor of the discharging circuit is greater than 8K ohms and less than 15K ohms.

In the discharging circuit, the third resistor R3 and the fourth resistor R4 are both used for limiting currents. The specific resistance of resistor R4 can be selected according to a junction capacitance of the transistor, wherein the greater the junction capacitance of the transistor is, the smaller the resistance of the fourth resistor will be; and the smaller the junction capacitance of the transistor is, the greater the resistance of the fourth resistor will be.

Yet another embodiment of the present disclosure provides a display device that includes the power supply according to any one of the embodiments described above.

For example, the display device may be any product or component having a display function, such as, a television set, an electronic paper, a mobile phone, a tablet computer, a TV, a display, a notebook computer, a digital photo frame, a navigator, or the like.

A discharging circuit of the display device according to the embodiment of the present disclosure may comprise: a controlling section, configured to adjust a voltage at the control node, under the control of a control voltage inputted from the control voltage inputting terminal; and a discharging section, configured to conduct a connection between the discharge voltage inputting terminal and the first level terminal, under the control of the voltage at the control node, so as to discharge the discharge voltage inputting terminal through the first level terminal. Therefore, the embodiment of the present invention can conduct the connection between the first capacitor bank to the first level terminal, under the control of the power supply inputting terminal, so as to discharge the voltage at the first capacitor bank rapidly and to reduce the discharging time of the second capacitor bank, which may avoid causing any inconveniences to a user.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations. Therefore, the scope of the present disclosure should be defined by the claims.

We claim:

1. A power supply, comprising: a rectification section, a power factor corrector, a transformer, a first capacitor bank, a second capacitor bank and a discharging circuit, wherein the discharging circuit comprises:
   a controlling section, connected to a control voltage inputting terminal and a control node, the controlling section configured to adjust a voltage at the control node, under control of a control voltage inputted from the control voltage inputting terminal; and
   a discharging section, connected to the control node, a first level terminal and a discharge voltage inputting terminal, the discharging section configured to conduct a connection between the discharge voltage inputting terminal and the first level terminal, under control of the voltage at the control node, so as to discharge a voltage at the discharge voltage inputting terminal through the first level terminal;
   wherein a first stage of the transformer is connected to a voltage inputting terminal via the rectification section and the power factor corrector; the first capacitor bank comprises at least one capacitor connected in parallel, a first terminal of the first capacitor bank being connected to the first stage of the transformer and a second terminal of the first capacitor bank being connected to a ground; the second capacitor bank comprises at least one capacitor connected in parallel, a first terminal of the second capacitor bank being connected to a secondary stage of the transformer and a second terminal of the second capacitor bank being connected to the ground; and the secondary stage of the transformer is connected to an outputting terminal for an operating voltage and an outputting terminal for a standby voltage; and
   wherein the control voltage inputting terminal of the discharging circuit is connected to the voltage inputting terminal, and the discharge voltage inputting terminal of the discharging circuit is connected to the first terminal of the first capacitor bank, and the first level terminal of the discharging circuit is connected to the ground.

2. The power supply of claim 1,
   wherein the discharging section comprises a third resistor, a fourth resistor and a MOS transistor;
   wherein a first terminal of the third resistor is connected to the control node, and a second terminal of the third resistor is connected to a gate of the MOS transistor;
   wherein a first terminal of the fourth resistor is connected to the gate of the MOS transistor, and a second terminal of the fourth resistor is connected to the first level terminal; and
   wherein a first terminal of the MOS transistor is connected to the discharge voltage inputting terminal, and a second terminal of the MOS transistor is connected with the first level terminal.

3. The power supply of claim 1, wherein the MOS transistor of the discharging circuit has a breakdown voltage greater than 400 V and less than 500 V.

4. The power supply of claim 1, wherein the third resistor of the discharging circuit has a resistance greater than 80 ohms and less than 120 ohms, and the fourth resistor of the discharging circuit has a resistance greater than 8K ohms and less than 15K ohms.

5. A display device, comprising the power supply of claim 1.

6. A display device, comprising the power supply of claim 3.

7. A display device, comprising the power supply of claim 4.

* * * * *